United States Patent Office 3,232,931

Patented Feb. 1, 1966

3,232,931

FIBER-REACTIVE METAL PHTHALOCYANINE DYES

Leonard Aaron Rothman, Brooklyn, N.Y., assignor to E. I. du Pont de Nemours and Company, Wilmington, Del., a corporation of Delaware No Drawing. Filed Nov. 28, 1962, Ser. No. 240,747
4 Claims. (Cl. 260—242)

The present invention relates to fiber-reactive dyes prepared from metal phthalocyanine polysulfonyl chlorides. It also relates to a process for preparing such fiber-reactive dyes.

Fiber-reactive dyes are well known in the art. Basically, dyes of this type have in their chemical structure a dye chromophore and at least one chemical group which will react with a hydroxyl or an amino group in a textile material, thus chemically bonding the dye to the fiber. Two of the newest classes of fiber-reactive dyes use as their reactive chemical group chloroquinoxalines and dichlorophthalazine radicals. The radicals are most frequently attached to a dye chromophore through a carbonyl amino group in the manner shown:

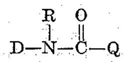

where D is the dye chromophore, R is hydrogen or lower alkyl, and Q is either a chloroquinoxaline radical or the dichlorophthalazine radical. Fiber-reactive dyes of the above general formula where D is a phthalocyanine chromophore are known. Such dyes afford the highly desirable turquoise shades often observed in wearing apparel.

The present invention is concerned with novel turquoise fiber-reactive dyes in which a phthalocyanine chromophore having certain critical substituents thereon is chemically joined to a fiber-reactive chloroquinoxaline group or to a fiber-reactive dichlorophthalazine group. These new dyes possess greatly improved lightfastness as compared with previously known dyes of this type.

The fiber-reactive dyes of this invention are mixtures of compounds of the following formula:

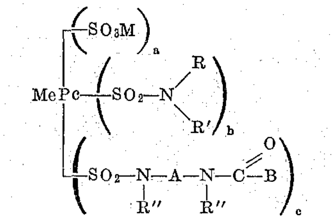

wherein

Me represents Cu, Ni, or Co
Pc represents the phthalocyanine nucleus
R represents H, $C_1$ to $C_4$ alkyl, 2-hydroxyethyl, 2-cyanoethyl, benzyl, phenyl, sulfophenyl, carboxyphenyl, cyclohexyl
R′ is selected from the group defined for R
R″ represents H, $C_1$ to $C_4$ alkyl, 2-hydroxyethyl, 2-cyanoethyl
$a$ is between 0 and 2
$b$ is 1 to 3
$c$ is 1 to 3
$a+b+c=3$ to 4
A represents a $C_2$ to $C_3$ alkylene radical,

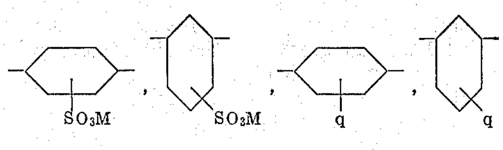

wherein $q$ represents H, $CH_3$, Cl
B represents

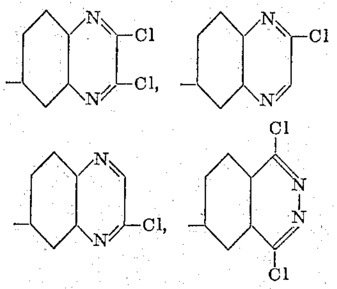

M represents Na, K, $NH_4$, H, and wherein each of the substituents shown in parentheses is located in a different benz ring.

It will be apparent to those skilled in the art that in any individual molecule within the above formula, the subscript "$a$" will be 0 or a whole number, and the subscripts "$b$" and "$c$" will be whole numbers. However, in the dyes actually produced in this invention, the subscripts denote an average value for the mixture. It will also be apparent that the positions of the substituents on the benz ring of the above formula are dependent upon the method of synthesis. The preferred dyes are those in which substantially all of the substituents are in the 3 position, since the preferred procedures of direct sulfonation and direct chlorosulfonation of metal phthalocyanine introduce the sulfo group into the 3 position. Preferred dyes are the copper phthalocyanine dyes, especially those of the following formulas:

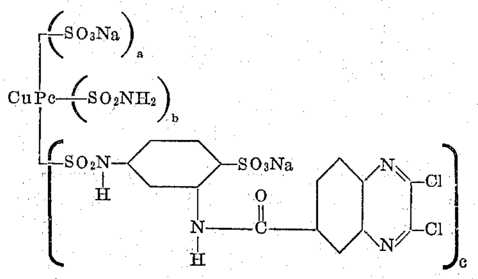

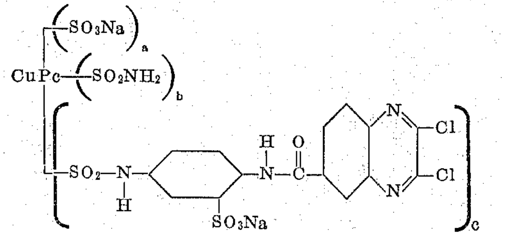

and

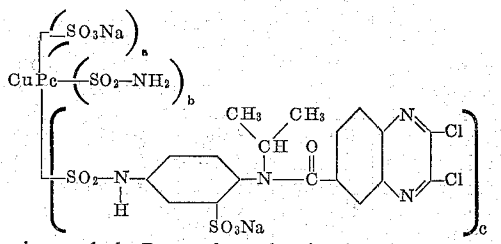

wherein symbols Pc, $a$, $b$, and $c$ in the above formulas have the same meanings as previously stated, and wherein substantially all of the substituents on the copper phthalocyanine nucleus are located in the 3, 3′, 3″, 3‴ positions.

Although copper phthalocyanine dyes are preferred, the corresponding nickel and cobalt derivatives can be made by following the procedure of any of the examples using a chemically equivalent amount of either the nickel or cobalt phthalocyanine in place of copper phthalocyanine in Examples I–V and VII, or by using a chemically equivalent amount of the corresponding nickel or cobalt phthalocyanine-4,4′,4″,4‴-tetrasulfonic acid in the procedure of Example VI. The free sulfonic acid form of the present dyes is obtained by treating aqueous solutions of the sulfonate salts with mineral acid such as sulfuric and hydrochloric acid.

The fiber-reactive dyes of this invention are produced in two separate condensation steps. The first condensation step is conducted at 5°–60° C. in aqueous medium and at a pH of 7.5–9. The reactants are (a) metal phthalocyanine polysulfonyl chloride, (b) a base selected from the group consisting of ammonia, alkyl monoamines, dialkyl monoamines and aryl monoamines such as aniline, the sulfoanilines, the carboxyanilines, and N-monoalkylanilines, and (c) a diamine of the formula $$R''NH—A—NH_2$$

where R″ has the meaning previously set forth above. A molar excess of each of the base and the diamine is used in the reaction. As the reaction proceeds, acid is liberated, and to maintain the pH of the reaction medium within the range of about 7.5–9, ammonia may be added to the reaction medium, or the same monoamine which is used as a starting material may be used for this purpose, or either or both of these materials may be used with an inorganic alkali such as sodium carbonate and the like. The reaction is continued until the pH remains constant without further additions. The condensation product may be isolated by a number of procedures. Preferably, an inorganic acid such as HCl is added, whereupon a dye base is precipitated which has the following structure:

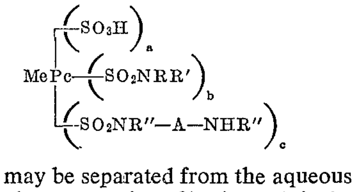

This dye base may be separated from the aqueous medium by conventional means such as filtering. It is then preferable to remove excess starting materials by washing with dilute acid before the dye base is used in the second condensation step involved in this invention. This second condensation step comprises condensing said dye base in an aqueous medium at about 15°–40° C. and at a pH of about 6–8 with a chlorobenzodiazinecarbonyl chloride selected from the group consisting of 2,3-dichloro-6-quinoxalinecarbonyl chloride, 2-chloro-6-quinoxalinecarbonyl chloride, 3-chloro-6-quinoxalinecarbonyl chloride, and 1,4-dichloro-6-phthalazinecarbonyl chloride. The chlorobenzodiazine is usually present in the aqueous medium in a ratio of 1–2 mols per mol of dye base and may be added as a powder, or it may be added as a solution in an organic solvent such as benzene, toluene, the xylenes, or the chlorobenzenes. The pH of the reaction medium can be maintained in the desired range by the addition of an acid acceptor such as sodium carbonate, sodium hydroxide, and the like. For optimum yields, the reaction should be continued until the pH of the aqueous medium is substantially constant without further addition of the acid acceptor. The fiber-reactive dye thus produced can be recovered by salting the reaction medium in the conventional manner with sodium chloride, followed by filtering. If a product of high purity is desired, it is recommended that the solution be clarified prior to salting and filtering. The filter cake may be converted to a dye paste, optionally with addition of surfactants by well-known procedures, or it may be dried at temperatures up to about 60° C. The fiber-reactive dye thus obtained is a light-fast dye of an attractive turquoise shade, and it possesses good application properties in such well-known dyeing methods as pad steam, exhaust, pad batch, and pad heat. Preferred reaction temperatures for the first condensation step are in the range of about 20°–50° C., while a preferred pH is about 8. Since the starting phthalocyanine polysulfonyl chloride of the first condensation often contains considerable residual sulfuric acid, it is often advantageous to partially neutralize this acid to about pH 2–4 with an inorganic alkali such as sodium hydroxide before the other two reactants for this condensation are added. Ammonium hydroxide or monoamines are used to further adjust and maintain the pH at 7.5–9 during this first condensation. When arylmonoamines are used, it is preferable to adjust and to maintain the pH during the condensation with an inorganic alkali or a combination of the amine and an inorganic alkali.

The preferred temperature for the second condensation step is in the range of about 25°–35° C., while the preferred pH is about 7.5. Generally, about 1.5 to 4 mols of diamine HR″N—A—NHR″ are condensed with one mol of the phthalocyanine polysulfonyl chloride in order to assure the formation of 1 to 3 of the $$—SO_2—NR''—A—NHR''$$

groups per molecule of dye base under the conditions described. About 1 to 3 mols of the benzodiazine carbonyl halide are employed per mol of the phthalocyanine polysulfonyl chloride, and preferably 1.2 to 2 mols, in order to react with all of the above-shown diamine groups.

The metal phthalocyanine polysulfonyl chlorides useful as starting materials are the tri or tetra 3-position sulfonyl chlorides, or the tri or tetra 4-position sulfonyl chlorides, or those having the sulfonyl chloride groups in mixed positions, e.g., 4,3′,3″,3‴ and 3,4′,4″,4‴. Any combination of the tri to tetra 3- and 4-position sulfonyl chlorides may be employed. These compounds are prepared by methods well known in the art. See for instance, U.S. Patent 2,219,330, British Patent 866,513, and Lubs, The Chemistry of Synthetic Dyes and Pigments, Reinhold, New York, 1955, page 609.

The alkylene diamines which are used to give the

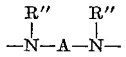

grouping in the general formula above are those having 2 to 3 carbon atoms. These are illustrated by monoacetyl ethylenediamine and monoacetyl (or formyl) 1,3-propanediamine. In order to provide R″ as alkyl when A is alkylene, one employs an alkylated diamine such as N-methyl-ethylenediamine, N,N′-dipropyl-1,3-propanediamine, N-(2-hydroxyethyl)-1,3-propanediamine, N-(2-cyanoethyl)-ethylenediamine, N-(2-cyanoethyl)-1,3-propanediamine, N-(2-hydroxyethyl)-ethylenediamine, N-butyl-ethylenediamine, or N-isobutyl-1,3-propanediamine.

The arylene diamines, HR″N—A—NHR″, operable in the present invention, which are employed in reaction with the above-mentioned metal phthalocyanine polysulfonyl chlorides include the following:

2,5-diaminobenzenesulfonic acid
5-amino-2-methylaminobenzenesulfonic acid
5-amino-2-ethylaminobenzenesulfonic acid
5-amino-2-isopropylaminobenzenesulfonic acid
5-amino-2-butylaminobenzenesulfonic acid
5-amino-2-(2-hydroxyethylamino)benzenesulfonic acid
5-amino-2-(2-cyanoethylamino)benzenesulfonic acid
2-amino-5-methylaminobenzenesulfonic acid
2,4-diaminobenzenesulfonic acid
4-amino-2-methylaminobenzenesulfonic acid
2-amino-4-ethylaminobenzenesulfonic acid
4-amino-2-butylaminobenzenesulfonic acid
4-amino-2-(2-hydroxyethylamino)benzenesulfonic acid
4-amino-2-(2-cyanoethylamino)benzenesulfonic acid
N-methyl-p-phenylenediamine
N-(2-hydroxyethyl)-p-phenylenediamine
N-(2-cyanoethyl)-p-phenylenediamine
N-sec-butyl-p-phenylenediamine m-Phenylenediamine
N,N'-diethyl-m-phenylenediamine
2,5-bis(methylamino)benzenesulfonic acid
N-methyl-m-phenylenediamine
N-(2-hydroxyethyl)-m-phenylenediamine
N-(2-cyanoethyl)-m-phenylenediamine
N-isobutyl-m-phenylenediamine
Toluene-2,4-diamine
Toluene-2,5-diamine
2-chloro-p-phenylenediamine
4-chloro-m-phenylenediamine Monoacylatable N-substituted aryl diamines, whose N-substituent is readily hydrolyzed following condensation with the metal phthalocyanine polysulfonyl chlorides, are also useful and they include the following compounds:

4'-aminoformanilide
4'-aminoacetanilide
3'-aminoformanilide
3'-aminoacetanilide
3'-amino-p-acetotoluidide
4'-amino-m-acetotoluidide.

The chlorobenzodiazinecarbonyl chlorides employed in this invention are four in number:

2,3-dichloro-6-quinoxalinecarbonyl chloride
2-chloro-6-quinoxalinecarbonyl chloride
3-chloro-6-quinoxalinecarbonyl chloride and
1,4-dichloro-6-phthalazinecarbonyl chloride.

The alkyl and aryl monoamines and ammonia are used during the initial condensation step (either alone or in the presence of inorganic alkali) to form the —$SO_2$—NRR' substituents. Ammonia is the preferred reagent for this purpose because of its low cost, low toxicity, and its convenience in controlling pH. Suitable amines include the group disclosed in Example V, namely, ethylamine, diethylamine, methylamine, dimethylamine, 2-hydroxyethylamine, and morpholine. Still other amines include 2-cyanoethylamine, isopropylamine, sec-butylamine, isobutylamine, butylamine, bis-(2-hydroxyethyl)amine, bis-(2-cyanoethyl)amine, N,N-dimethyl-1,3-propanediamine, N-methyl-propylamine, orthanilic acid, metanilic acid, sulfanilic acid, cycolhexylamine, benzylamine, anthranilic acid, aniline, and N-methylaniline.

For a clearer understanding of the invention, the following specific examples are given. These examples are intended to be merely illustrative of the invention and not in limitation thereof. Unless otherwise specified, all parts are by weight.

*Example I*

To 160 parts of chlorosulfonic acid cooled to 5° C. are added 23 parts of copper phthalocyanine at such a rate as not to exceed 25° C. This slurry is stirred 15 minutes, heated over 1.5 hours to 135±5° C. and stirred at this temperature for 3.5 hours. The dark green solution is cooled to room temperature, and is drowned in a mixture of ice and water at a temperature below 5° C. The solid, which is collected by filtration and washed with 5° C. aqueous 1% hydrochloric acid solution, corresponds to a mixture of compounds of the structure

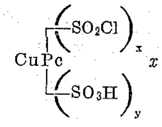

$x + y = 3\text{-}4$ in which all substituents modified by $x$ and $y$ are primarily located in the 3, 3',3'' and 3''' positions. To this sulfonyl chloride filter cake, slurried in 1200 parts of ice-water, are added 22.5 parts of 2,4-diaminobenzenesulfonic acid and enough 10 N sodium hydroxide to give a pH of 5.

The pH is raised to 9.0 with ammonium hydroxide, and the temperature is raised to 25° to 30° C. The reaction mass is stirred at this temperature until the pH remains at 8.8–9.2 without further addition of ammonia (about 15 hours). The solution is acidified with hydrochloric acid to precipitate a dye base mixture of the following structure:

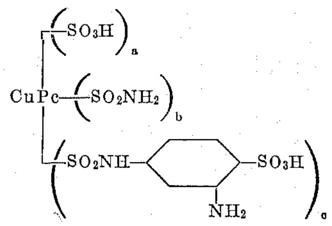

This dye base is filtered, washed free of excess diamine with hydrochloric acid solution, and reslurried in 1500 parts of water at 35° to 40° C. This dye base suspension is neutralized to pH 7.2 with sodium hydroxide, after which 21 parts of finely powdered 2,3-dichloro-6-quinoxalinecarbonyl chloride are added. After rapidly stirring for 8 hours at 35° to 40° C. and pH 7–7.5 (maintained with sodium hydroxide) the pH remains constant. The resulting turquoise solution is clarified by filtration and carefully salted to 18% with sodium chloride (18 parts NaCl per 82 parts water). The product corresponding to the mixture

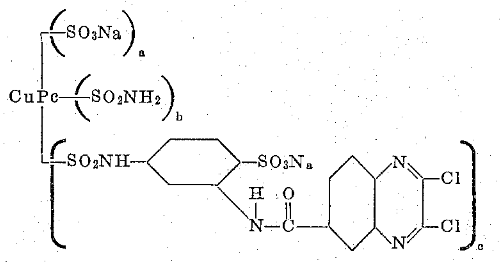

is filtered off, washed free of a tan color with 20% sodium chloride solution and dried below 60° C. in a vacuum oven.

On analysis, the turquoise dye so obtained is found to contain 1.1 dichloroquinoxaline radicals, 1.3 sulfamoyl radicals, and 2.6 sodium sulfonate groups. Thus, the values for *a*, *b*, and *c* are 1.5, 1.3, and 1.1, respectively.

When a solution of 4 parts of this dye, 4 parts of salt, 1 part of sodium hydroxide (30% solution), and 1 part of trisodium phosphate in 100 parts of water is padded on cotton at 60% pick-up, the fabric rolled, allowed to stand for 2 hours, and scoured, there results a bright turquoise shade which has good wet and light fastness.

Dye mixtures of similar shade, light and wet fastness are obtained when one uses in place of 2,4-diaminobenzenesulfonic acid an equal molar portion of 2,5-diaminobenzenesulfonic acid, 2-chloro-p-phenylenediamine, or 5-amino-2-ethylaminobenzenesulfonic acid, or mixtures of the aryldiamines.

Dye mixtures of similar properties but of slightly greener and duller shade are obtained when one substitutes in place of copper phthalocyanine equal molar amounts of nickel or cobalt phthalocyanine.

Dye mixtures of similar shade, light and wet fastness are obtained when one uses in place of 2,3-dichloro-6-quinoxalinecarbonyl chloride equal molar parts of 2 (or 3)-chloro-6-quinoxalinecarbonyl chloride or 1,4-dichloro-6-phthalazinecarbonyl chloride.

*Example II*

The sulfonyl chloride prepared as in Example I from 23 parts of copper phthalocyanine is slurried in 1200 parts of ice-water with 29.8 parts of 2,5-diaminobenzenesulfonic acid and the pH is adjusted to 7.5 with ammonium hydroxide. The mixture is heated to 50° C. and stirred for 2 hours while maintaining the pH at 7.5–8.0 by the addition of ammonium hydroxide. The dye base is isolated as in Example I by filtration after cooling and acidifying to pH 1 with hydrochloric acid. The dye base is then redissolved in 1500 parts of water and vigorously stirred for 4 hours at room temperature and pH 6–7 (maintained with sodium hydroxide) with 45 parts of xylene containing 15.6 parts of 3-chloro-6-quinoxalinecarbonyl chloride. The turquoise solution is clarified and salted to 16% with sodium chloride. The precipitated dye mixture is filtered, washed with a sodium chloride solution, and air dried. This dye mixture has the structure:

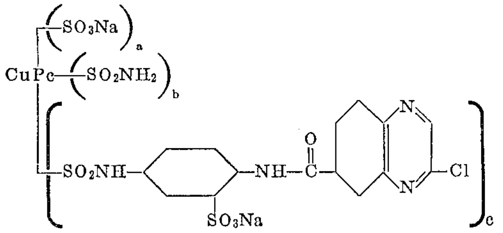

which by analysis has values for *a*, *b*, and *c* of 0.9, 1.2, and 1.6, respectively.

When this dye is applied to cellulose textile materials by the conventional pad-steam application method for reactive dyes, there results a dyeing of the same shade and fastness properties as in Example I.

In place of the copper phthalocyanine, one can use an equal molar amount of 4-sulfo copper phthalocyanine as starting material in the chlorosulfonation step to give a dye mixture of similar shade and fastness properties. In this instance, one of the sulfonyl group occupies the 4-position and 2 to 3 sulfonyl groups occupy the 3-positions of copper phthalocyanine.

*Example III*

23 parts of copper phthalocyanine are slowly added with stirring to 160 parts of chlorosulfonic acid and the mixture is heated to 135±5° C. and stirred at this temperature for 3 hours. The mixture is cooled at 75° C., 35 parts of thionyl chloride are added, and the mixture is then stirred for 2 hours at 85° C. The blue solution is cooled to room temperature, poured slowly into a mixture of ice and water, and the precipitated phthalocyanine 3,3′,3″,3‴-sulfonyl chloride of the structure $$CuPc{-}(SO_2Cl)_{3-4}$$

is filtered and washed with a 1% aqueous hydrochloric acid solution at 0° to 5° C.

To the sulfonyl chloride paste, stirred in 1200 parts of ice-water, are added 13.0 parts of 5-amino-2-ethylaminobenzenesulfonic acid, 0.25 part of pyridine, and enough 10 N sodium hydroxide solution to give a pH of 4–5. The pH of the mixture is then raised to 8±0.2 with an aqueous solution of ammonium hydroxide and the temperature is raised to 55±5° C. over a 1-hour period and maintained for an additional hour, the pH being held at 8±0.2 throughout by the addition of ammonium hydroxide solution. At this point, the mixture is cooled, acidified to pH 2 with hydrochloric acid, and the precipitated dye base mixture

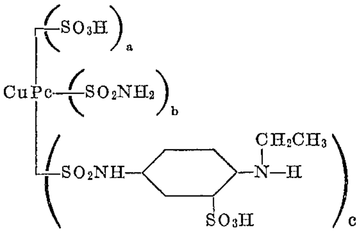

is filtered, washed free of excess diamine with 500 parts of a 4% hydrochloric acid solution and redissolved in 1600 parts of water at 35° to 40° C. and pH 7–7.5 (using sodium hydroxide). To this turquoise solution is added with vigorous stirring 35 parts of monochlorobenzene containing 10.5 parts of 2,3-dichloro-6-quinoxalinecarbonyl chloride. The reaction mixture is stirred at 35–40° C. and pH 7.5–8 (maintained by the addition of aqueous sodium carbonate) for 3 hours, clarified by filtration and the filtrate is salted to 12% brine with solid sodium chloride. The precipitated dye mixture of the structure

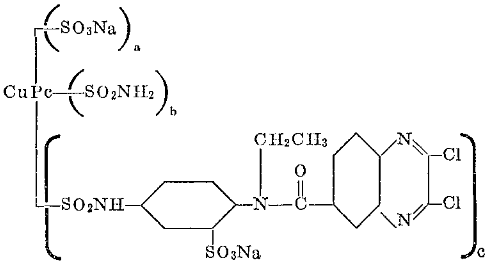

is filtered and dried.

On analysis, the turquoise dye so obtained is found to contain 1.1 dichloroquinoxaline radicals, 2.3 sulfamoyl groups, and 1.4 sodium sulfonate groups. Thus, the average values for *a*, *b*, and *c* are 0.3, 2.3 and 1.1, respectively.

When a solution of 4 parts of this dye mixture
100 parts of water
10 parts of urea
2 parts of sodium bicarbonate is applied to cellulose textile materials by padding, followed by heating at 350° F. for 1.5 minutes and scouring, there results a bright turquoise shade with good wet and light fastness.

A preferred dye of similar shade and properties is obtained by using 5-amino-2-isopropylaminobenzenesulfonic acid in place of 5-amino-2-ethylaminobenzenesulfonic acid in the same molar portions. Also, dyes of similar shade and properties are obtained by using the following in the same molar portions used in this example:

5-amino-2-methylaminobenzenesulfonic acid
5-amino-2-(2-hydroxyethylamino)benzenesulfonic acid
4-amino-2-methylaminobenzenesulfonic acid
2-amino-4-ethylaminobenzenesulfonic acid or those diamines mentioned in the other examples.

One may use in place of the thionyl chloride such chlorides as sulphuryl chloride, phosphorus pentachloride, phosphorus oxychloride or phosphorus trichloride, or mixtures of these chlorides. Also, when one uses in place of 2,3-dichloro-6-quinoxalinecarbonyl chloride, equal parts of 1,4-dichloro-6-phthalazinecarbonyl chloride, or 2 or 3-chloro-6-quinoxalinecarbonyl chloride, there result equally fast turquoise shades.

*Example IV*

To the sulfonylchloride paste (prepared from 23 parts of copper phthalocyanine acording to the procedure of paragraph 1, Example III) in 1200 parts of ice-water, are added 9.4 parts of 4′-aminoformanilide and 13.8 parts of metanilic acid. The pH of the agitated mixture is adjusted to pH 8 with aqueous sodium hydroxide. The reaction mixture is then warmed to 30±5° C., and agitated for 24 hours while maintaining the pH at 7.5–8 with aqueous sodium hydroxide. The reaction mass is acidified with 60 parts of concentrated hydrochloric acid and then heated for 2 hours at 95±5° C. After cooling the slurry, the precipitated solid of the structure

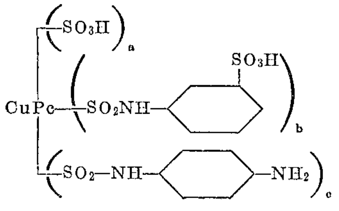

is filtered off, washed with 3% aqueous hydrochloric acid and redissolved in 1400 parts of 30° C. to 35° C. water at pH 7.5 (using aqueous sodium hydroxide). To this solution are added with vigorous stirring 12.5 parts of finely divided 2,3-dichloro-6-quinoxalinecarbonyl chloride. This mixture is stirred 14 hours at 30° to 35° C. and pH 7.5±0.5 (maintained with aqueous sodium hydroxide), salted with sodium chloride to 11% and the precipitated dye mixture is filtered, washed with sodium chloride solution and dried. The turquoise dye mixture

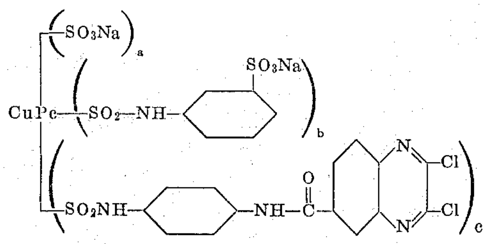

when dyed onto cellulose textile fibers from a long volume with sodium sulfate and sodium carbonate gives bright turquoise shades which are fast to washing and light.

A dye mixture of equal properties is obtained when one employs in place of the 4′-aminoformanilide equal molar portions of either monoacetylethylenediamine or 3′-amino acetanilide.

*Example V*

The sulfonyl chloride filter cake prepared from 23 parts of copper phthalocyanine according to paragraph 1 of Example I is slurried in 1000 parts of cold water with 20.1 parts of 2,4-diaminobenzenesulfonic acid and the pH is adjusted to 7–7.5 with a 10% aqueous solution of ethylamine. The reaction mixture, maintained at pH 7–7.5 by the addition of 10% aqueous ethylamine solution, is warmed to 40° C. and agitated for 4 hours at this temperature. The dye base mixture of the structure

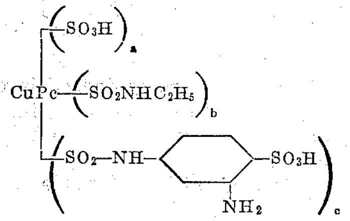

is isolated by filtration and washing after being acidified with hydrochloric acid. The wet dye base cake is dissolved at pH 7–7.5 (using sodium hydroxide) in 1600 parts of water and then stirred with 40 parts of monochlorobenzene containing 12.5 parts of 2,3-dichloro-6-quinoxalinecarbonyl chloride, as in Example III. Isolation of the fiber-reactive turquoise dye mixture is accomplished after clarification, as in Example III. This dye gives bright turquoise dyes when applied to cellulose fibers by the methods mentioned above.

When, in place of the above solution of ethylamine, one employs an aqueous solution of morpholine, diethylamine, methylamine, 2-hydroxyethylamine, or dimethylamine, similar results are obtained.

*Example VI*

40.0 parts of copper phthalocyanine-4,4′,4″,4‴-tetrasulfonic acid are stirred into 500 parts of chlorosulfonic acid, below 35° C. The slurry is warmed slowly to 130° to 140° C., agitated for 3 hours at this temperature, cooled and drowned in an ice and water mixture at a temperature below 5° C. The precipitated solid is filtered, washed at 0° to 5° C. with 1% aqueous hydrochloric acid, and reslurried at 5° to 10° C. in 1600 parts of water. To this mixture are added 20.0 parts of 2,4-diaminobenzenesulfonic acid, 0.5 part of pyridine, and enough 10 N sodium hydroxide solution to raise the pH to 4.0. The pH of the mixture is raised to 8±0.2 with ammonium hydroxide solution, and the temperature is raised to 50° C. while maintaining the pH with ammonia. After stirring for 4 hours at these conditions, the mixture is cooled, acidified with hydrochloric acid, and the precipitated dye base mixture is filtered and washed with 3% hydrochloric acid solution.

To this dye base filter cake, dissolved in 1800 parts of water at pH 6.5–7 using sodium hydroxide, are added 13.0 parts of 2,3-dichloro-6-quinoxalinecarbonyl chloride dissolved in 30 parts of xylene. The reaction mixture is stirred vigorously for 4 hours at room temperature and pH 6.5–7.5 maintained with sodium hydroxide, and then filtered. The filtrate is salted with sodium chloride to 8% solution and the precipitated dye mixture is filtered off, washed with sodium chloride solution, and dried.

When this dye mixture is applied to cellulosic material at 120° F. from a long volume bath with sodium sulfate and sodium carbonate, there results a bright turquoise dyeing of good fastness to wash and light.

A dye mixture of similar shade and properties is obtained when one employs in place of the copper phthalocyanine-4,4′,4″,4‴-tetrasulfonyl chloride equal molar amounts of the 3,4′,4″,4‴-tetrasulfonyl chloride, 3,3′,3″-trisulfonyl chloride, or 4,4′,4″-trisulfonyl chloride derivatives of copper, nickel or cobalt phthalocyanines.

When one employs 2- or 3-chloro-6-quinoxalinecarbonyl chloride in place of the 2,3-dichloro derivative of this example, there results turquoise dyes which have similar shades and fastness properties.

*Example VII*

The isolated dye base prepared from 23 parts of copper phthalocyanine and 22.5 parts of 2,4-diaminobenzenesulfonic acid in the manner set forth in the first two paragraphs of Example I is slurried in 1600 parts of water at 35±5° C. This dye base suspension is neutralized to pH 7.2 with sodium hydroxide, after which 22.5 parts of finely powdered 1,4-dichloro-6-phthalazinecarbonyl chloride are added. After rapidly stirring for 6 hours at 35±5° C. and pH 7–7.5 (maintained with sodium hydroxide) the pH remains constant. The resulting turquoise solution is clarified by filtration and carefully salted to 21% with sodium chloride. The turquoise product corresponding to the mixture

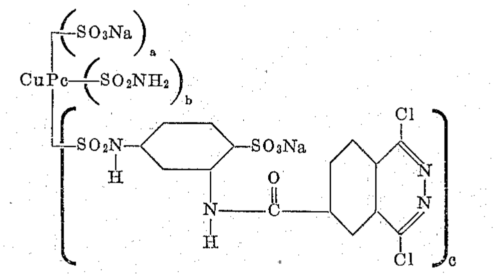

is filtered, washed with sodium chloride solution and dried below 50° C.

The following two examples illustrate methods for the preparation of the fiber-reactive linking agent used in the above examples.

*Example VIII*

To 24.6 parts of trimellitic anhydride slurried in 100 parts of glacial acetic acid, is added at reflux over a ½-hour period a solution of 5 parts of hydrazine hydrate in 30 parts of glacial acetic acid. The resulting slurry is refluxed 8 hours and cooled. The solid, 1,4-dihydroxy-6-phthalazinecarboxylic acid, is filtered, washed with acetic acid, dried, and added to a mixture of 60 parts of phosphorus pentachloride and 15 parts of phosphorus oxychloride. This slurry is refluxed at 120°±10° C. for 4 hours, cooled, diluted with 70 parts of petroleum ether (B.P. 30° to 60° C.) and the precipitated colorless solid, 1,4-dichloro-6-phthalazinecarbonyl chloride, M.P. 130°–

132° C., is filtered, rinsed with petroleum ether, and dried.

*Example IX*

80 parts of 2,3-dihydroxy-6-quinoxalinecarboxylic acid (prepared by the condensation of 3,4-diaminobenzoic acid and oxalic acid ethyl ester as in British Patent 315,451) are slurried with 4 parts of dimethylformamide in 320 parts of p-xylene and heated to 110° C. At this temperature, 120°±10° C., 125 parts of phosgene are added over a 5-hour period. The clear solution is clarified of the resulting brown tar and the solvent is distilled under vacuum at 120° C. leaving a light-brown oil which is cast into pans, cooled and ground. There is obtained 97 parts of 2,3-dichloro-6-quinoxalinecarbonyl chloride, a tan powder, M.P. 111–113° C.

When equal molar amounts of 2-hydroxy-6-quinoxalinecarboxylic acid and 3-hydroxy - 6 - quinoxalinecarboxylic acid are used in the present example in place of 2,3-dihydroxy-6-quinoxalinecarboxylic acid, one obtains, respectively, 2-chloro-6-quinoxalinecarbonyl chloride, M.P. 127–129° C., and 3-chloro-6-quinoxalinecarbonyl chloride, M.P. 120°–122° C.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Fiber-reactive dyes of the following formula:

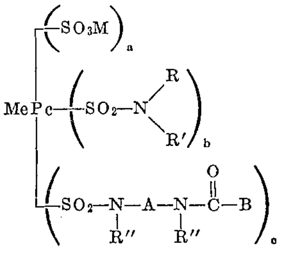

wherein

Me is selected from the group consisting of Cu, Ni, and Co

Pc is phthalocyanine

R is selected from the group consisting of H, $C_1$ to $C_4$ alkyl, 2-hydroxyethyl, 2-cyanoethyl, benzyl, phenyl, sulfophenyl, carboxyphenyl, and cyclohexyl R′ is selected from the group defined for R R″ is selected from the group consisting of H, $C_1$ to $C_4$ alkyl, 2-hydroxyethyl, and 2-cyanoethyl

*a* is between 0 and 2

*b* is 1 to 3

*c* is 1 to 3

$a+b+c=3$ to 4

A is selected from the group consisting of $—C_2H_4—$, $—C_3H_6—$,

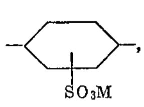, 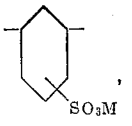, 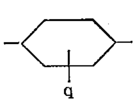 and 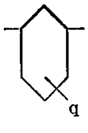

wherein *q* is selected from the group consisting of H, $CH_3$, and Cl

B is selected from the group consisting of

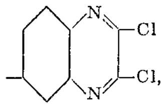, 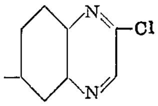

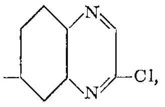, and 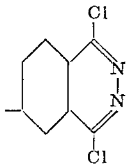

M is selected from the group consisting of Na, K, $NH_4$ and H, and wherein each of the substituents shown in parentheses is located in a different benz ring.

2. A fiber-reactive dye of the formula

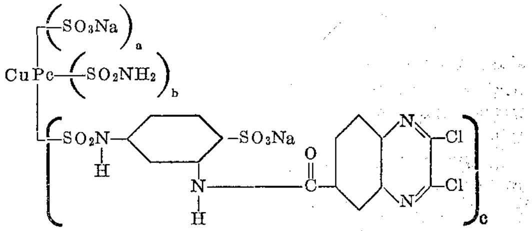

wherein Pc, *a*, *b*, and *c* are as defined in claim 1 and wherein substantially all of the substituents on the copper phthalocyanine nucleus are located in the 3, 3′, 3″ and 3‴ positions.

3. A fiber-reactive dye of the formula

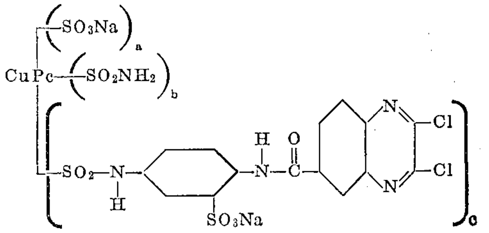

wherein Pc, *a*, *b*, and *c* are as defined in claim 1 and wherein substantially all of the substituents on the copper phthalocyanine nucleus are located in the 3, 3′, 3″ and 3‴ positions.

4. A fiber-reactive dye of the formula

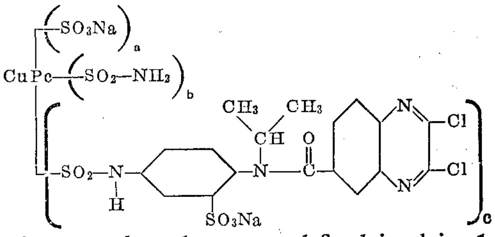

wherein Pc, *a*, *b*, and *c* are as defined in claim 1 and wherein substantially all of the substituents on the copper phthalocyanine nucleus are located in the 3, 3′, 3″ and 3‴ positions.

References Cited by the Examiner

UNITED STATES PATENTS

| | | | |
|---|---|---|---|
| 3,053,849 | 9/1962 | Clark et al. | 260—314.5 |
| 3,053,850 | 9/1962 | Clark et al. | 260—314.5 |
| 3,057,873 | 10/1962 | Pugin et al. | 260—314.5 |
| 3,105,070 | 9/1963 | Bitterli | 260—242 |

FOREIGN PATENTS

| | | |
|---|---|---|
| 241 | 5/1962 | Republic of South Africa. |
| 805,562 | 12/1958 | Great Britain. |

WALTER A. MODANCE, *Primary Examiner.*

NICHOLAS S. RIZZO, *Examiner.*